G. F. MILLER.
FILTER PRESS DEVICE.
APPLICATION FILED APR. 14, 1919.
1,330,332.
Patented Feb. 10, 1920.
5 SHEETS—SHEET 5.
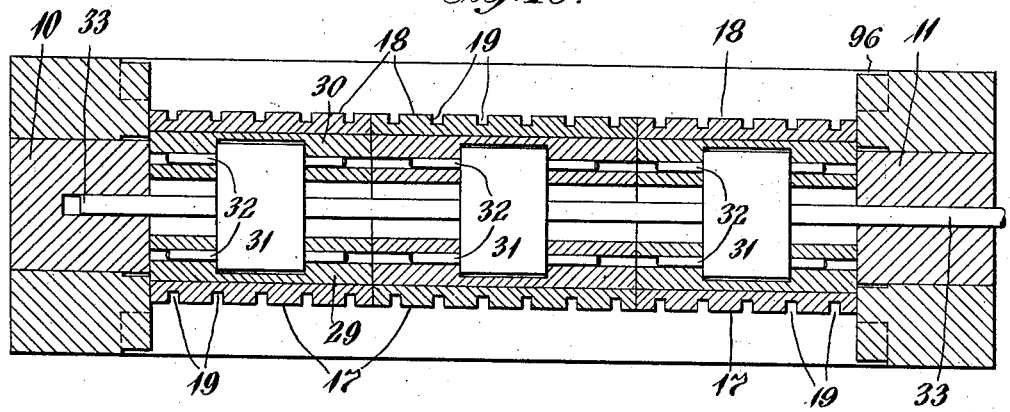
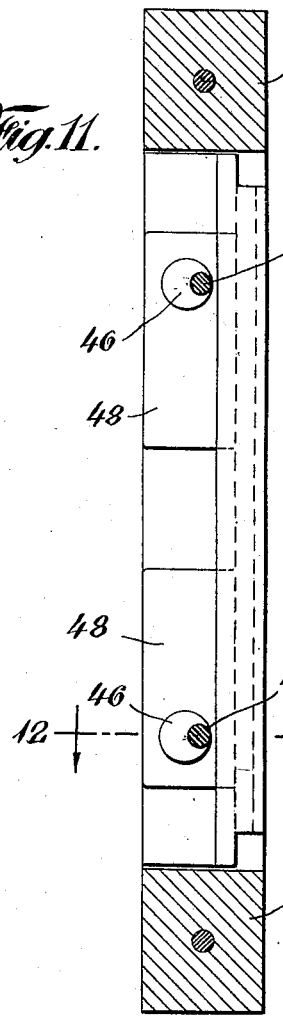
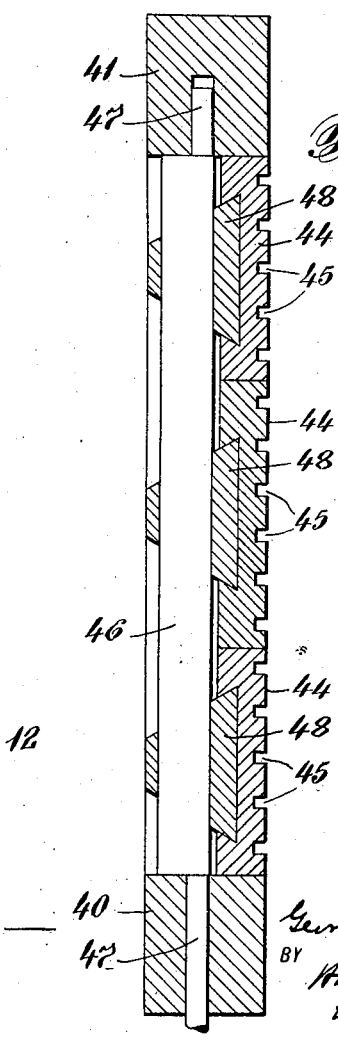

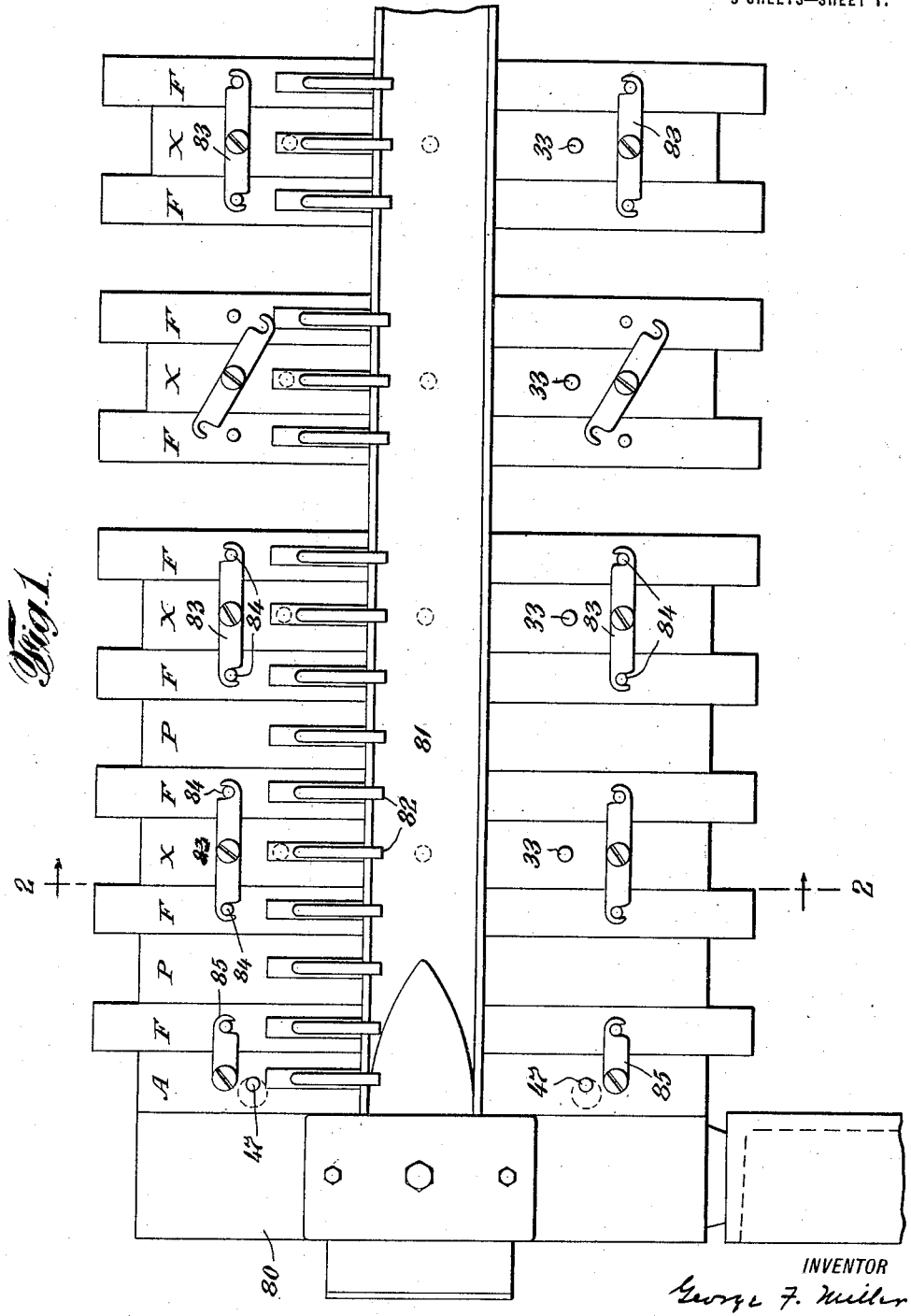

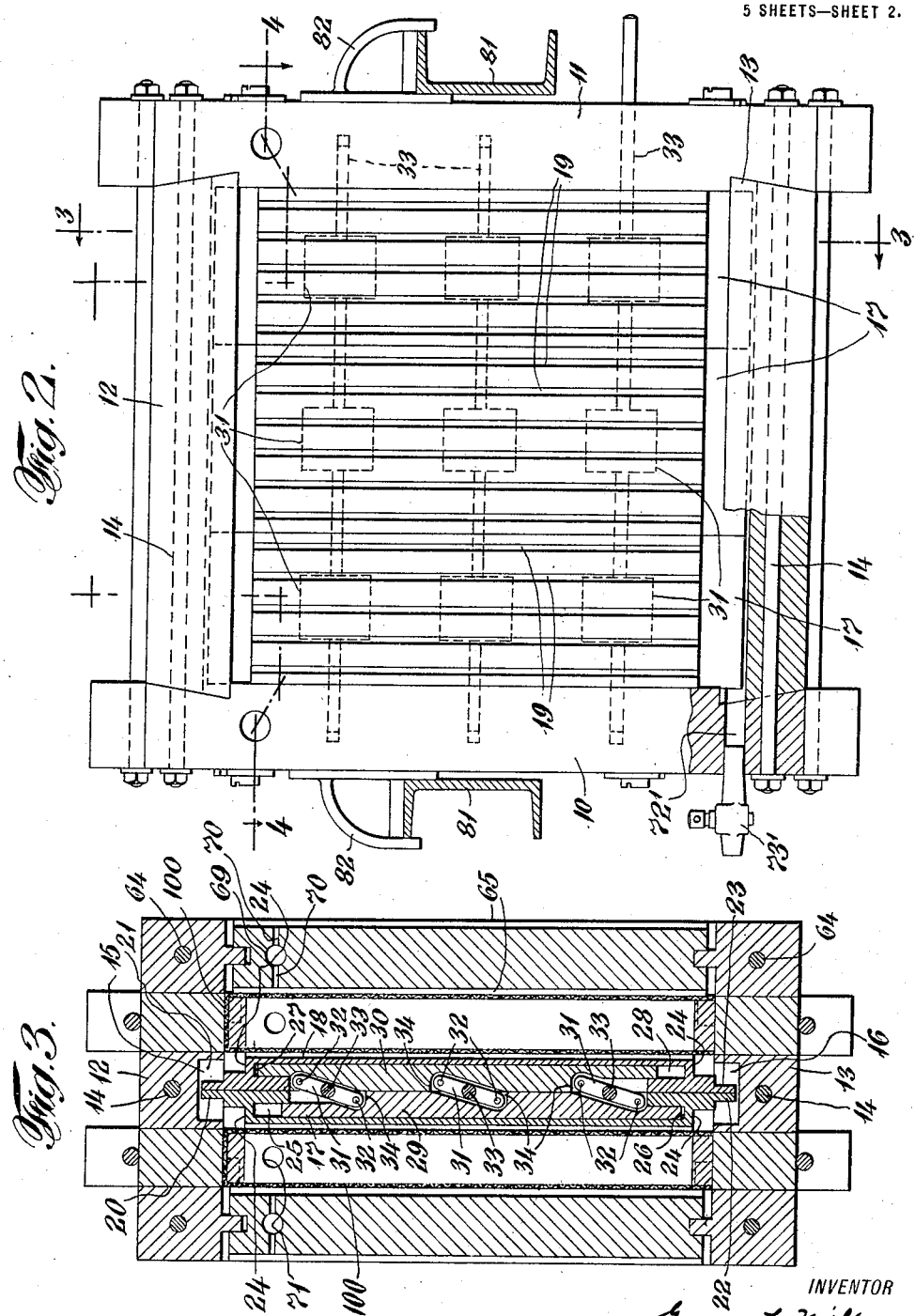

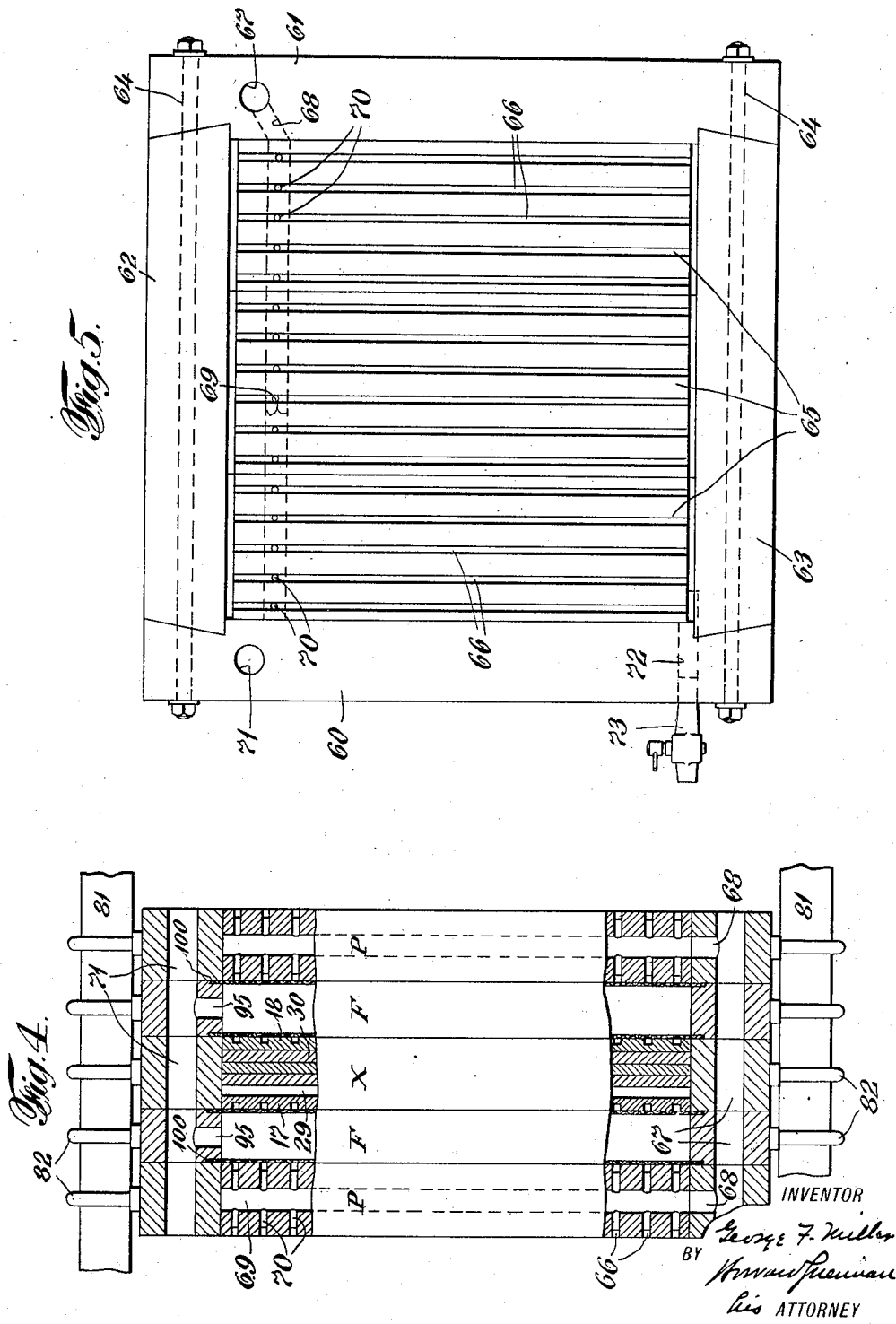

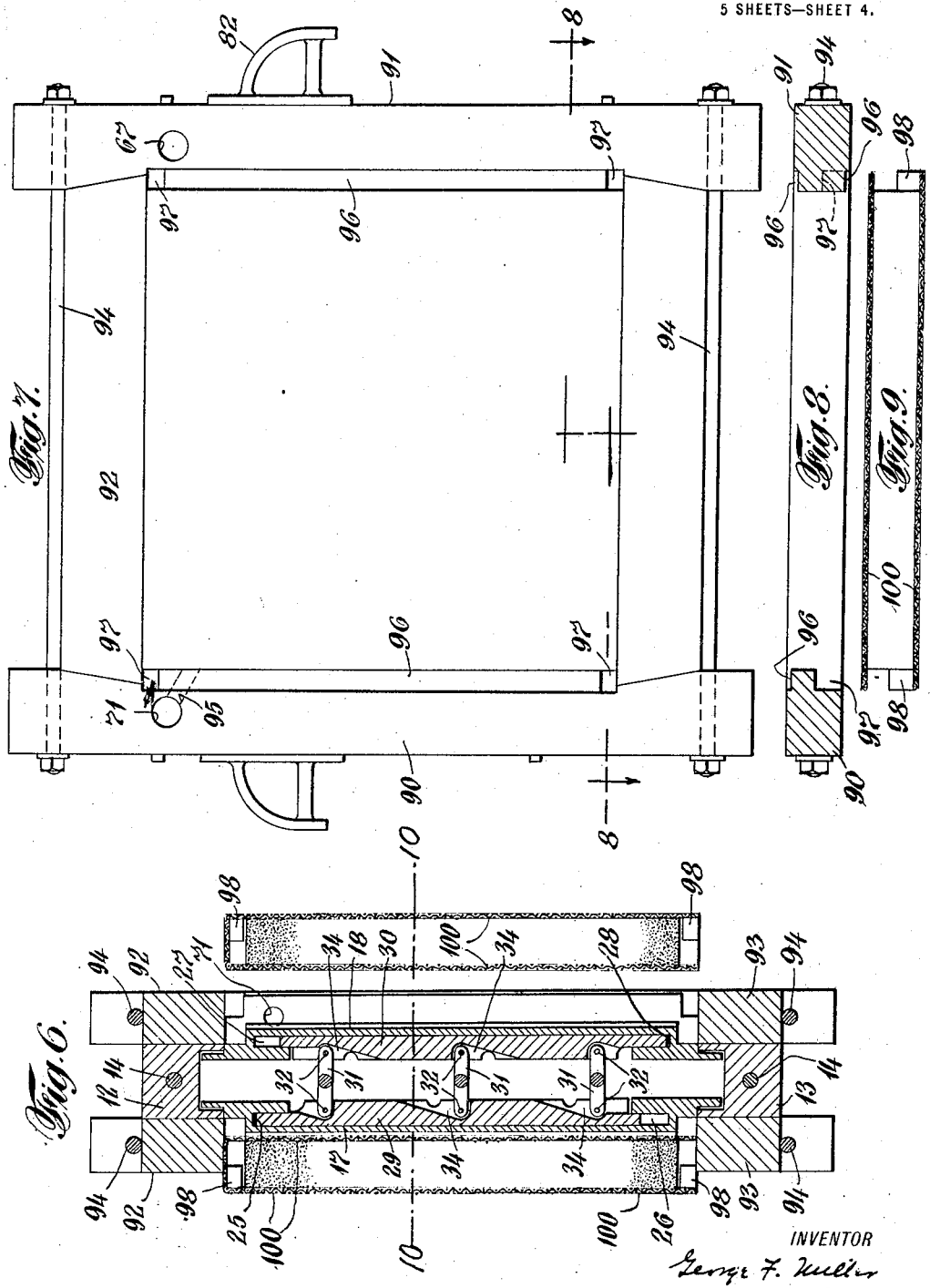

UNITED STATES PATENT OFFICE.

GEORGE F. MILLER, OF NEW YORK, N. Y.

FILTER-PRESS DEVICE.

1,330,332. Specification of Letters Patent. Patented Feb. 10, 1920.

Application filed April 14, 1919. Serial No. 289,983.

*To all whom it may concern:*

Be it known that I, GEORGE F. MILLER, a citizen of the United States, residing in the city of New York, county of New York, borough of Manhattan, and State of New York, have invented certain new and useful Improvements in Filter-Press Devices, of which the following is a full, clear, and exact specification.

My invention relates to filter press devices and refers particularly to filter press plates.

One object of my invention is a filter press device whereby retained filtered material may be compressed within the press.

Another object of my device is means whereby filtered material may be readily removed from the filter press frames.

Another object of my device is means whereby filtered material may be removed from the press frames while the latter is still in abutment with a filter press plate.

Another object of my invention is a device whereby the trouble and danger incident to properly alining the holes of a filter cloth with those of the feed and wash conduits are overcome.

Another object of my invention is a device in which the assembling of the plates and frames of a filter press is greatly facilitated.

Another object of my device is means whereby the removal of filtered material from the press may be accomplished in a minimum of time with a minimum of labor.

These and other objects of my invention will be evident upon a consideration of my drawings, specification and claims.

The ordinary filter press comprises a series of alternate filter press plates and frames separated by filter cloth and held in close abutment with each other.

The material to be filtered is forced through a main feed conduit and a series of frame feed-conduits into the space formed by the frame and its two abutting plates, the filtered material remaining within this space and the filtrate passing outwardly through the filter cloth. The thus filtered material is then washed by forcing water by means of a main wash conduit and a series of plate wash conduits through the filter cloth, inwardly through the filtered material and then outwardly of the press by any suitable means. It is evident that as the last portion of material to be filtered, or the wash water, passes through the filtered material, it leaves the latter thoroughly saturated with liquid which must be removed by a later drying process. This requires additional labor for the handling of the large quantity of contained liquid, renders the handling thereof extremely difficult and causes a very considerable waste of fuel in the drying process.

The device of my invention overcomes these difficulties to a very large extent, as it allows the filtered material to be compressed within the frame without disturbance of the assembled frames and plates, thus causing a very considerable saving in labor, fuel and time expended in handling and drying.

After the material is filtered in the ordinary press, the abutting means upon the frames and plates is released and the filtered material removed from the frames. This is accomplished by separating a frame from its abutting plates and manually forcing the filtered material into a receptacle and then removing the filter cloth from around the frame. This necessitates the handling of each frame separately as otherwise the filtered material and the filter cloth can not be removed.

The device of my invention overcomes these difficulties. In the use of my device, a plate is held in abutment with its two adjacent frames and by the revolution of a member both frames are immediately freed from their filtered contents and their filter cloths. This causes a very considerable saving in labor and in time consumed in emptying the frames.

In the ordinary filter press, the filter cloth extends completely across the faces of adjacent frames and plates. This requires that the cloth have a series of holes corresponding exactly with the feed and wash conduits, and that these cloth holes be in absolute alinement with the feed and wash conduits, in order that there may be no interference with the flow of liquid. This necessitates the greatest care upon the part of the operator and is a constant source of trouble.

The device of my invention overcomes this difficulty as the cloth does not extend across the adjacent faces of the frames and plates and does not have any holes whatever in it, and hence no care of this character must be exercised and there is no danger of interrupting the proper flow of the liquid.

In addition, it is to be noted that the old form of press requires that every frame be separated from every plate in order that the filter cloth be placed in position, a condition which does not exist in my device, in which the filter cloth may be properly positioned while the frame and its adjacent plate are in abutment.

It will thus be seen that the device of my invention presents many novel and economically valuable features over those now known for the filtering of materials by means of a filter press.

In the particular form of my device, shown in the accompanying drawings, similar parts are designated by similar numerals:—

Figure 1 is a fragmentary diagrammatic side elevation of an assembled filter press with parts omitted.

Fig. 2 is a section through the line 2—2 of Fig. 1.

Fig. 3 is a section through the line 3—3 of Fig. 2 with the plate of my device in a non-expanded position.

Fig. 4 is a section through the line 4—4 of Fig. 2.

Fig. 5 is a side plan view of an ordinary wash filter plate.

Fig. 6 is a vertical section with the plate of my device in an expanded position.

Fig. 7 is a side plan view of a filter press frame suitable for use with my device.

Fig. 8 is a section through the line 8—8 of Fig. 7.

Fig. 9 is a top plan view showing the means for carrying the filter cloth within a frame.

Fig. 10 is a section through the line 10—10 of Fig. 6.

Fig. 11 is a vertical mid-section of a single expansion plate adjacent to the head of the press.

Fig. 12 is a section through the line 12—12 of Fig. 11.

The particular form of the device of my invention, shown in the accompanying drawings comprises a filter press plate composed of the side pieces 10 and 11, the top piece 12 and the bottom piece 13 held together by the rods 14, 14. The top 12 has a recess 15 and the bottom 13 has a recess 16. Within the frame of the filter press plate is a movable field comprising a series of field elements 17, 17, 17 abuttable upon the field elements 18, 18, 18, the outer faces of the field elements when thus abutted having a series of channels 19, 19, 19. The fixed elements 17 and 18 have extended members 20 and 21 respectively, capable of insertion within the recess 15, and extended members 22 and 23 respectively, capable of insertion within the recess 16. The members 17 and 18 also have shoulders 24, 24. The member 17 has the upper recess 25 and the lower recess 26, and the member 18 has the upper recesss 27 and the lower recess 28. Between the field members 17 and 18 is a floatable expansion member comprised of the two side plates 29 and 30 pivotally connected to the revoluble arms 31, 31, 31 by means of the dowel pins 32, 32, 32. The arms 31, 31, 31 are fixedly attached to the bars 33, 33, 33 revoluble within the side members 10 and 11, the lower bar 33 extending beyond the side member 11 in order that it may be revolved by exterior means. The plates 29 and 30 contain the recesses 34, 34, 34 of such a size, shape and position that the arms 31, 31, 31 will fit therein when the plates 29 and 30 are in abutment.

This portion of the device has the conduit 72' and the faucet 73' for the escape of the liquid.

The operation of this portion of the device is as follows:

Fig. 3 shows the device in its non-expansible position and Fig. 6 shows it in expansible position. When the lower bar 33 is revolved, the other arms 33, 33 are similarly revolved moving the plates 29, 29, 29 and 30, 30, 30 upwardly and downwardly respectively, and outwardly from each other, the plate 29 moving into the recess 25 and the plate 30 into the recess 28. As the plates 29 and 30 move outwardly they move the field members 17, 17, 17 away from the field members 18, 18, 18, thus expanding the filter plate field. A reverse movement of the bar 33 will return the plates 29 and 30 and the field members 17 and 18 into their original unexpanded position.

As the end plate, or liner plate, of an assembled filter press has only one of its sides presented to the filtering material, it is necessary that only this one side be expansible from within its supporting frame, and I accomplish this as shown in Figs. 11 and 12. The frame comprises the side members 40 and 41, the top member 42 and the bottom member 43 held together by any suitable means. Within the thus formed frame are the three movable field members 44, 44, 44 having the corrugations 45, 45, 45 upon the one face thereof. Annular cam members 46, 46 are maintained revolubly within the side members 41 and 42 by the annular extended members 47, 47, one end of which extends beyond the side member 40, in order that the extended members 47, 47 may be revolved by exterior means. Dovetailed within the back of each field member 44 are two members 48, 48 having an opening through which the cam member 46 passes and with which cam member the opening conforms.

In order to expand the field members 44, 44, 44, the lower bar 47 is revolved thus revolving the cam member 46 and forcing the lower portions of the field members 44, 44, 44 outwardly. The same operation by the upper bar 47 forces the upper portions of the field members 44, 44, 44 outwardly. The field members 44, 44, 44 may be drawn inwardly within the frame by imparting a reverse revoluble motion to the bar 47, 47.

Fig. 5 shows an ordinary wash plate, formed from the sides 60 and 61, the top 62 and the bottom 63 held together by the stay-rods 64, 64. It carries a movable field composed of the field members 65, 65, 65 having corrugations 66, 66. The side 61 has the main wash conduit 67 connected with the conduit 68 leading into the conduit 69 within the field members 65, 65, 65, the conduit 69 being connected to the corrugations of the field members 65, 65, 65 by the conduits 70, 70, 70. The side member 60 has the feed conduit 71 to connect with the feed conduit of an adjoining frame. The conduit 72 and the faucet 73 allow the removal of the liquid.

Fig. 7 shows an ordinary filter press frame composed of the sides 90 and 91, the top 92 and the bottom 93, connected by the stay bolts 94, 94. The side 90 has the main feed conduit 71 connected to the conduit 95 and the side 91 has the main wash conduit 67.

The method of carrying the filter cloth within the frame is as follows:—

Slight vertical recesses 96, 96 are cut upon the inner portion of the faces of the sides 90, 91. Deeper recesses 97, 97, 97, 97 are cut at the extremities of the recesses 96, 96 upon one face of the sides 90 and 91. Bars 98, 98 are capable of being fitted into the recesses 97, 97. A filter cloth 100 is hung over the upper bar 98 and extends downwardly from both sides thereof, the sides of the cloth fitting snugly into the recesses 96, 96 to form a tight joint with an abutting filter press member when assembled.

It is evident therefore that when pressure is brought against one side of the filter cloth, the cloth, the bars 98, 98 and the contents of the cloth will be forced outwardly from the frame.

Fig. 1 illustrates one method of building up a filter press with the expansion plates of my invention. The filter press head 80 supports two side bars, one of which 81 is shown, upon which the various plate and frame members are supported by the arms 82, 82, 82. In the arrangement shown A is a single expansion end plate, F is an ordinary feed filter frame, P is an ordinary wash plate, X is a double expansion plate. Each expansion plate X is capable of being attached to the adjacent frames F F by means of the pivoted double hook catch 83, capable of being attached to the extended pins 84, 84, 84 of the frames, and the single expansion member A can be similarly attached to the adjacent frame F by means of the pivoted catch 85.

The operation of the assembled device is as follows:

The material to be filtered is forced through the main feed conduit 71, passing through the frame feed conduits 95, 95 into the filter cloth bag 100 formed within the frame. The liquid passes through the cloth and escapes through the conduits 72, 72' and the faucets 73, 73', the filtered material remaining within the cloth covered space of the frame. When all of the material is forced therethrough, the lower extended bar 33 is revolved thus forcing the expansion plates 29 and 30 and the field plates 17, 17, 17, and 18, 18, 18, outwardly compressing the filtered material and forcing a large proportion of the liquid therefrom. The expansion plates 29 and 30 and the field plates 17, 17, 17 and 18, 18, 18 are then returned to their unexpanded position and wash water forced through the main wash conduit 67 and the field wash conduits 68, 68, 69, 69, 70, 70 and the material washed. When the washing operation is completed the expansion plates 29 and 30 and the field plates 17, 17, 17 and 18, 18, 18 are again expanded extracting a large proportion of water from the filtered material and then returned to their original unexpanded position.

The filtered material is now ready to be removed from the press which is accomplished as follows, as shown in the right hand portion of Fig. 1:—

The regular follower head of the press, not shown, is withdrawn thus removing the pressure upon the plates and frames and allowing them to be moved upon the supporting bars 81, 81. All of the ordinary wash plates P P are removed thus leaving a series of expansive plates X X, each having abutting frames F F to which they are attached by means of the members 83, 83. The extended bar 33 of an expansion plate is then revolved forcing the field plates 17, 17, 17 and 18, 18, 18 outwardly, this movement forcing the filter cloth and the cakes of material out of the two frames into a receptacle. By these means the entire amount of material is removed from the frame as it is contained within the cloth bag, whereas in the present employed methods the material must be removed by hand leaving a considerable amount of material adhering to the frame unless great care is exercised. When the filter press is to be recharged, the cloth bags are inserted within the frames, as described above without removing the frames from the expansion plates.

The material within the frame adjacent to the end single expansion plate A is removed in a similar manner by revolving the bars 47, 47.

While I have illustrated the fields as composed of a series of field plates 17, 17, 17 and 18, 18, 18, I do not limit myself to this particular construction, as it is evident that each of these series may be substituted by one field plate without otherwise changing the construction of my device as shown and described.

My device thus presents a means for the compression of excess liquid from the filtered material cakes, for the rapid and thorough discharge of the filter cakes from the frames and for an effective means of charging the frames with filter cloth without danger of interrupting the flow of the incoming liquids.

I do not limit myself to the particular size, shape, number or arrangement of parts as shown and described, all of which may be varied without going beyond the scope of my invention as shown, described and claimed.

What I claim is:

1. In a filter press device, in combination, a frame, two movable field plates within the frame and means connecting the field plates whereby they may be moved inwardly and outwardly with respect to each other.

2. In a filter press device, in combination, a filter plate frame, a movable field plate within the frame, a revoluble member abutting upon the field plate and means for revolving the revoluble member moving the field plate outwardly of the frame.

3. In a filter press device, in combination, a filter plate frame, a movable field plate comprised of a series of fields within the frame, revoluble members abutting upon the series of fields and means for revolving the revoluble members moving the fields outwardly of the frame.

4. In a filter press device, in combination, a filter plate frame, two movable field plates within the frame, revoluble members abutting upon the field plates and means for revolving the revoluble members moving the fields outwardly from each other.

5. In a filter press device, in combination, a filter plate frame, two series of field plates within the frame and means for moving the two series of field plates outwardly from each other.

6. In a filter press device, in combination, a filter plate frame, two series of field plates within the frame and means for moving the two series of field plates inwardly and outwardly from each other.

7. In a filter press device, in combination, a filter press frame, two series of movable field plates within the frame, revoluble means abutting upon the two series of field plates and means for revolving the revoluble members moving the two series of field plates outwardly from each other.

8. In a filter press device, in combination, a filter plate frame, two field plates within the frame, an expansible member between the two field plates, means for expanding the expansible member forcing the field plates outwardly from each other and means for moving the expanded members inwardly drawing the field plates inwardly toward each other.

9. In a filter press device, in combination, a filter plate frame, two series of field plates within the frame, an expansible member between the two series of field plates and means for expanding the expansible member forcing the two series of field plates outwardly from each other.

10. In a filter press device, in combination, a filter plate frame, two series of field plates within the frame, an expansible member between the two series of field plates, means for expanding the expansible member forcing the two series of field plates outwardly from each other and for withdrawing the expanded members drawing the two series of field plates inwardly toward each other.

11. In a filter press device, in combination, a filter plate frame, two field plates within the frame, a member abutting upon the inner face of each field plate, means for moving the abutting members from each other forcing the field plates outwardly from each other and for withdrawing the expanded abutting members drawing the field plates toward each other.

12. In a filter press device, in combination, a filter plate frame, two series of field plates within the frame, a member abutting upon the inner face of each series of field plates and means for moving the abutting members from each other forcing the two series of field plates outwardly from each other.

13. In a filter press device, in combination, a filter plate frame, two series of field plates within the frame, a member abutting upon the inner face of each series of field plates, means for moving the abutting members from each other forcing the two series of field plates outwardly from each other and means for moving the expanded abutting members inwardly drawing the field plates toward each other.

14. In a filter press device, in combination, a filter plate frame, two field plates within the frame, a slidable member abutting upon the inner face of each field plate, means for moving the abutting members from each other forcing the field plates outwardly from each other and means for drawing the expanded abutting members inwardly toward each other.

15. In a filter press device, in combination, a filter plate frame, two series of field plates within the frame, a slidable member abutting upon the inner face of each series of field plates, means for moving the abutting members from each other forcing the field plates outwardly from each other, means for drawing the expanded abutting members inwardly toward each other and means whereby the inward movement of the expanded members will draw the field plates inwardly toward each other.

Signed at New York city in the county of New York and State of New York this 10th day of April, 1919.

GEORGE F. MILLER.